United States Patent [19]

Kobayashi et al.

[11] Patent Number: 5,045,380

[45] Date of Patent: Sep. 3, 1991

[54] LAMINATION TYPE INDUCTRO

[75] Inventors: Takashi Kobayashi; Hiroyuki Takeuchi; Minoru Tamada, all of Nagaokakyo, Japan

[73] Assignee: Murata Manufacturing Co., Ltd., Nagaokakyo, Japan

[21] Appl. No.: 397,652

[22] Filed: Aug. 23, 1989

[30] Foreign Application Priority Data

Aug. 24, 1988 [JP] Japan ............................... 63-211060

[51] Int. Cl.[5] ............................................... B32B 9/00

[52] U.S. Cl. .................................... 428/195; 428/209; 428/457; 428/901

[58] Field of Search ............... 428/195, 209, 457, 901; 336/232, 235; 333/167

[56] References Cited

U.S. PATENT DOCUMENTS

| | | | |
|---|---|---|---|
| 3,732,514 | 5/1973 | Sato | 336/232 |
| 3,765,082 | 10/1973 | Zyeta | 333/167 |
| 3,812,442 | 5/1974 | Muckelroy | 333/167 |
| 4,542,553 | 9/1985 | Mandai et al. | 428/195 |
| 4,543,553 | 9/1985 | Mandai et al. | 336/232 |
| 4,689,594 | 8/1987 | Kawabata et al. | 336/225 |
| 4,904,967 | 2/1990 | Morii et al. | 333/167 |

FOREIGN PATENT DOCUMENTS

| | | |
|---|---|---|
| 3022347 | 2/1981 | Fed. Rep. of Germany . |
| 2379229 | 9/1979 | France . |
| 55-67158 | 5/1980 | Japan . |
| 63-102715 | 5/1988 | Japan . |

*Primary Examiner*—Patrick J. Ryan
*Attorney, Agent, or Firm*—Wenderoth, Lind & Ponack

[57] ABSTRACT

A lamination type inductor having a ferrite layer having opposite main surfaces each with a periphery including opposite ends having end edges thereat, the ferrite layer further having end edges at the opposite ends of the main surfaces and a through hole therein along the periphery, the ferrite layer having a conductor pattern on each main surafce thereof, the conductor pattern on one main surface having a first end portion along one end of the one main surface and extending 0.75 turn from about the middle of the first end portion along the periphery of the one main surface of the ferrite layer to the through hole, and the conductor pattern on the other main surface having a second end portion along the other end of the other main surface and extending 0.75 turn from about the middle of the second end portion along the periphery of the other main surface of the ferrite layer to the through hole, the conductor patterns being electrically connected through the through hole for forming a substantially 1.5-turn coil; outside ferrite layers laminated onto the opposite main surfaces of ferrite layer and having outside end portions corresponding to the opposite ends of said ferrite layer; and outside electrodes on the outside of the laminated body at the respective outside end portions of the outside ferrite layers and the end edges of the ferrite layer and electrically connected with the first and second end portions.

1 Claim, 4 Drawing Sheets

LAMINATION TYPE INDUCTRO

BACKGROUND OF THE INVENTION

The present invention relates to a lamination type inductor, and more particularly, to a lamination type inductor used for preventing noise and the like.

The conventional lamination type inductor used for preventing noise and the like has been constructed, as shown in FIG. 4, by laminating outside ferrite layers on both main surfaces of a ferrite layer 3 having a linear conductor pattern 2 extending from one end to the other. These ferrite layers 3 and outside ferrite layers 4 were laminated so as to be integral, and then sintered and then, as shown in FIG. 5, provided with outside electrodes 5 to form a lamination type inductor 1.

However, in such a lamination type inductor 1 as described above, since the conductor pattern 2 is linear, only a small inductance can be obtained. Thus, to obtain a larger inductance, a lamination type inductor 6 has been designed which is shown in FIG. 6. This inductor 6 comprises a first ferrite layer 8 on one main surface of which is formed a first conductor pattern 7 designed to be an end portion of a coil, and a second ferrite layer 11 on both main surfaces of which are formed second conductor patterns 10 corresponding to half a coil and which are connected through a through hole. First ferrite layers 8 and second ferrite layers 11 are laminated so that the first conductor pattern 7 and the second pattern 10 are connected to form a coil. With this lamination type inductor 6, a larger inductance can be obtained than with the inductor 1 shown in FIGS. 4 and 5.

But, the conventional lamination type inductor as shown in FIG. 6 requires a plurality of different conductor patterns on a plurality of ferrite layers that not only the number of printings but the number of through holes must be increased, thereby taking much time to manufacture and being subject to defects during production. Moreover, lamination of a plurality of conductor pattern causes a number of connecting points to occur on the conductor patterns to form them into coils, whereby the electric connections between the conductor patterns formed on respective ferrite layers are sometimes poor, thereby lowering reliability of the finished product.

OBJECTS AND BRIEF SUMMARY OF THE INVENTION

A first object of the invention is to provide a lamination type inductor having superior productivity and work efficiency during manufacturing.

A second object of the invention is to provide a lamination type inductor capable of positively connecting conductor patterns, creating fewer inferior products and making the product high in reliability.

DETAILED DESCRIPTION OF THE INVENTION

Figure 1:
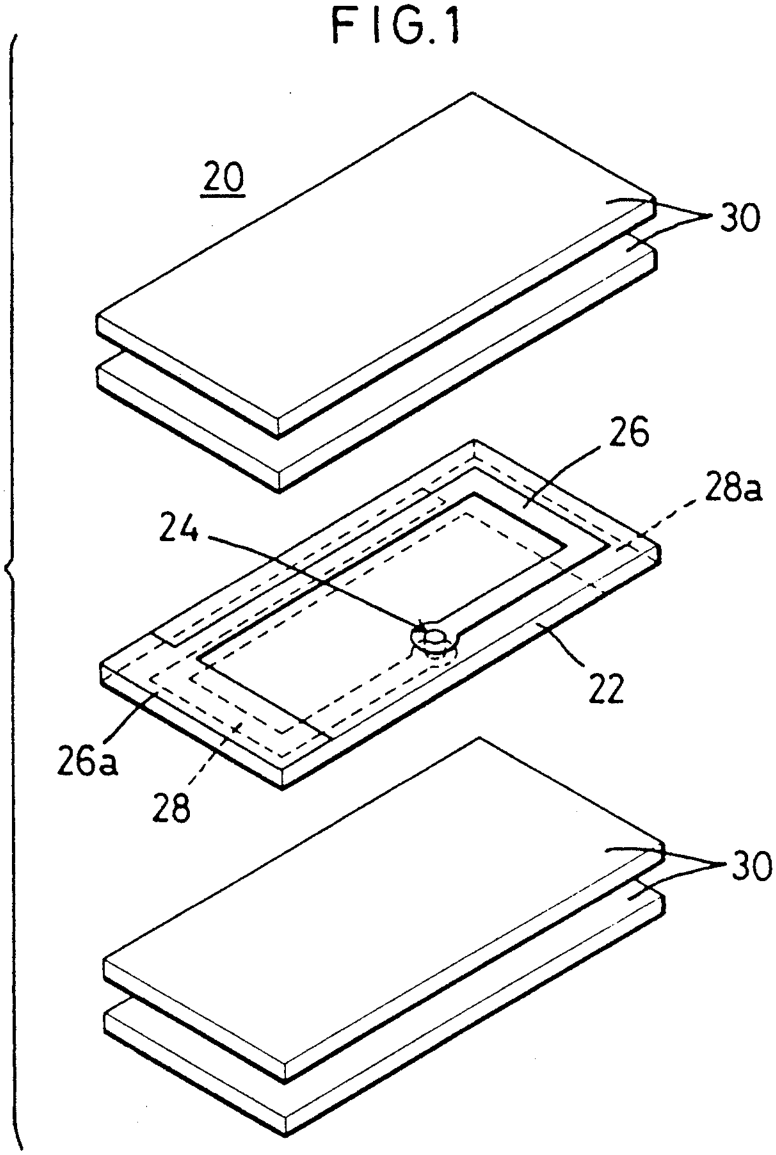
FIG. 1 is an exploded perspective view showing an embodiment of the lamination type inductor of the present invention.
Figure 2:
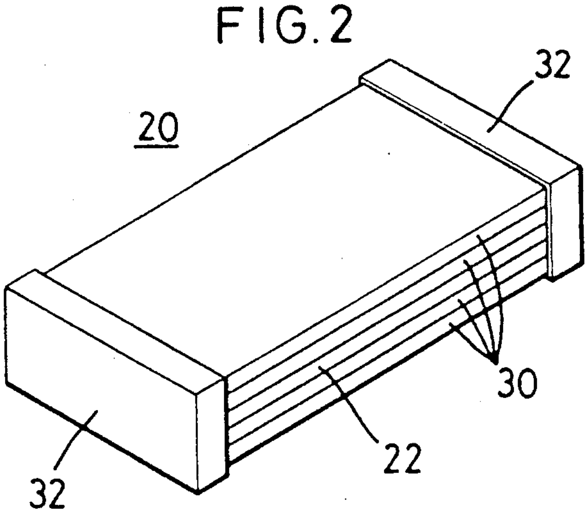
FIG. 2 is a perspective view of the lamination type inductor in FIG. 1 in finished form.

The lamination type inductor 20 according to the present invention comprises ferrite layer 22, as shown in FIGS. 1 and 2.

In the above-described ferrite 22 is formed one through hole 24. In addition, on one main surface of the ferrite layer 22 is formed a first conductor pattern 26 with a length of 0.75 turn extending from one end of the ferrite layer to the through hole 24 along the periphery of the one main surface of the layer 22. A first end portion 26*a* of the first conductor pattern 26 is provided along one end edge of the one main surface of the ferrite through layer 22 to be electrically connected with an outside electrode described below.

The length of 0.75 turn of the first conductor pattern is defined to mean the distance from the central portion of the first end portion 26*a* to the through hole 24 along the periphery of the one main surface of the ferrite layer 22.

Moreover, on the main surface of the ferrite layer is formed a second conductor pattern 28 with a length of 0.75 turn exending from the other end main surface of the ferrite layer to the through hole 24 along the periphery of the other main surface of the ferrite layer 22. A second end portion 28*a* of the second conductor pattern 28 is provided along the other edge of the second main surface of the ferrite layer 22 to be electrically connected with an outside electrode described below.

The length of 0.75 turn of the second conductor pattern is defined to mean the distance from the central part of the second end portion 28*a* to the through hole 24 along the periphery of the other main surface of the ferrite layer.

The first and second conductor patterns 26 and 28 are electrically connected through the through hole 24, thereby forming a coil.

Onto both main surfaces of the ferrite layer 22 are laminated outside ferrite layers 30 formed of the same material as that of the ferrite layer 22. The outside ferrite layers 30 serve as magnetic cores for the first conductor pattern 26 and the second conductor pattern 28.

The outside end edges of the ferrite layer 22 and the outside end portions of said outside ferrite layers 30 are provided with two outside electrodes 32. These outside electrodes 32 are electrically connected with the end portions 26*a* and 28*a* of the first conductor pattern 26 and the second conductor pattern 28, respectively.

Thus, an inductance is formed between the outside electrodes 32.

Figure 3A:
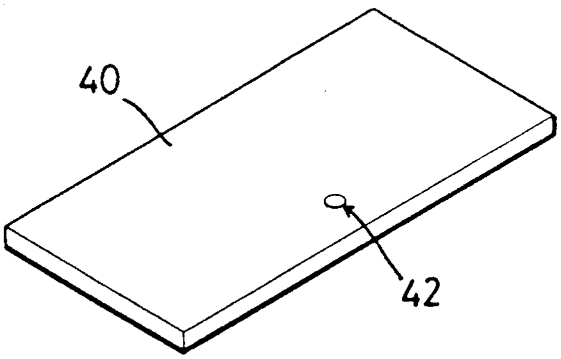
FIGS. 3(A) through 3(C) are illustrations showing in order the manufacturing steps for manufacturing the lamination type inductor shown in FIGS. 1 and 2.

A ceramic green sheet 40 is used, as shown in FIG. 3A, to manufacture the lamination type inductor 20 described above. The green sheet 40 is obtained by using such processes as extrusion, pulling up and blading so as to form a sheet-shaped substance of a mud-like ceramic material made by blending from, for example, ferrite powder, organic solvent and a binder. The ceramic green sheet 40 is provided with a through hole 42.

Figure 3B:
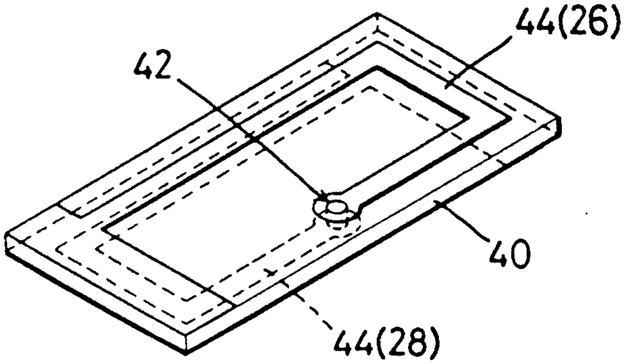

On one main surface of the ceramic green sheet 40 is applied conductive paste 44 in such a manner as to be shaped like the first conductor pattern 26 with a length of 0.75 turn, as shown in FIG. 3(B). In addition, on the other main surface of the green sheet 40 is also applied the paste 44 shaped like the second pattern with a length of 0.75 turn.

Since the conductive paste flows into the through hole 42 at the time of printing the conductor patterns 26 and 28 on both surfaces of the ceramic green sheet 40, the patterns 26 and 28 are electrically connected through the through hole 42.

If the first and second conductor patterns are each made to be exactly 0.75 turn in length, the same screen printing pattern may be used to apply the conductive paste to both surfaces. However, there is no need for both conductor patterns 26 and 28 to have exactly the same length of 0.75 turn.

Figure 3C:
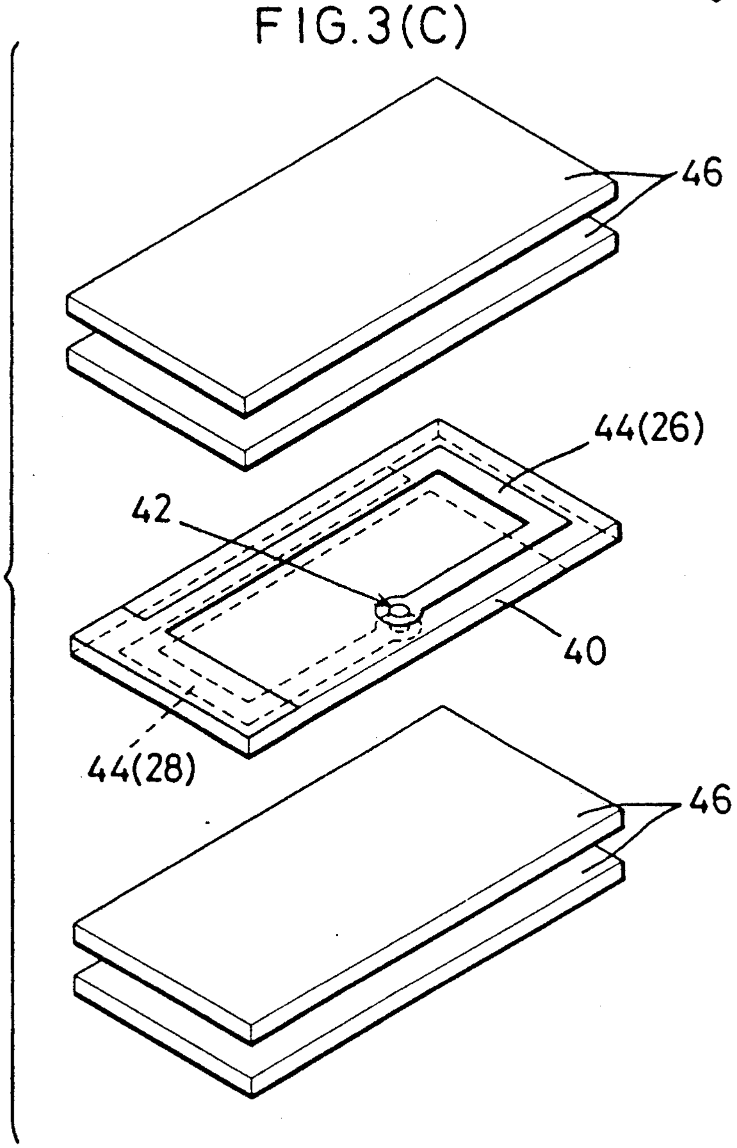
Figure 4:
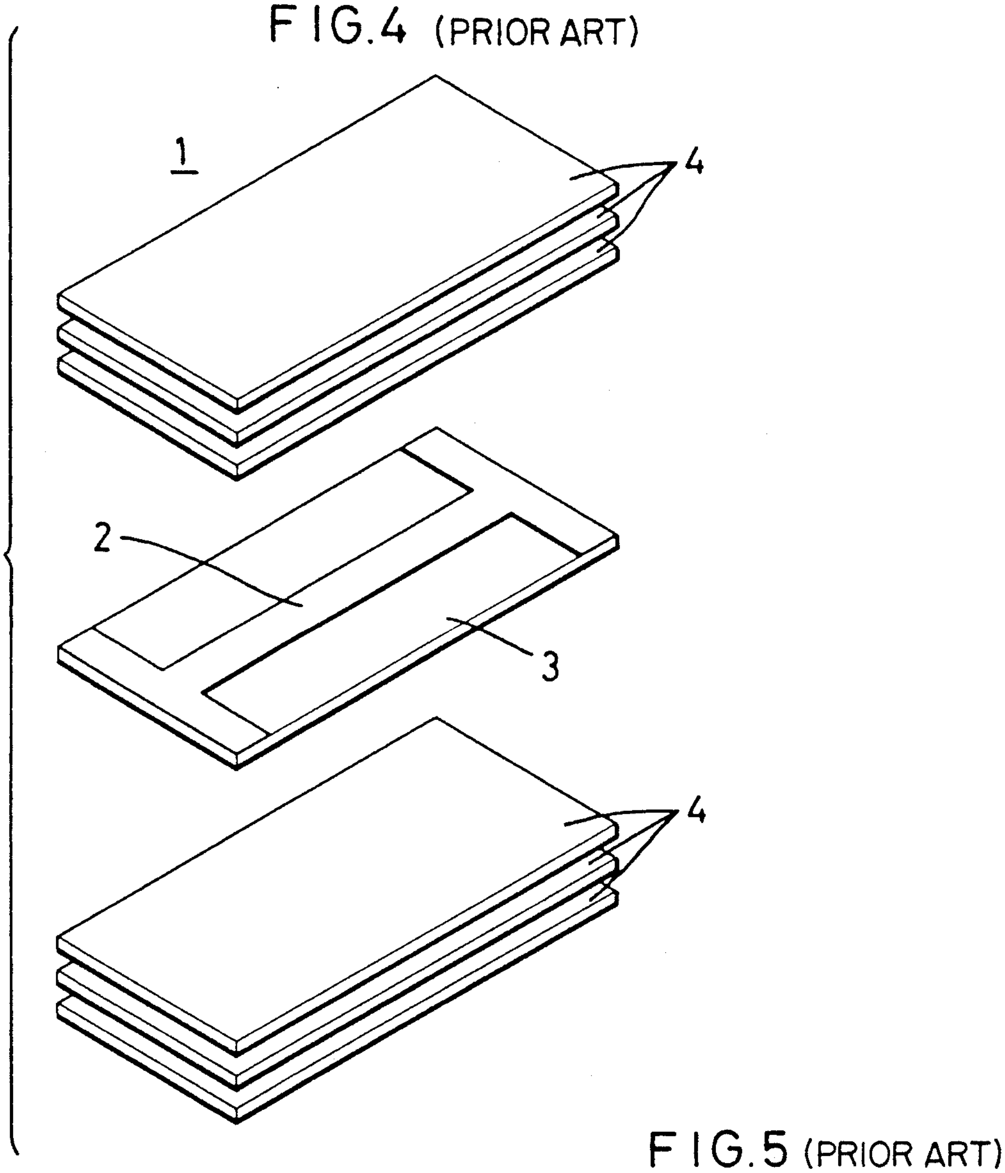
FIG.4 (PRIOR ART)
FIG. 4 is an exploded perspective view showing a conventional lamination type inductor.
Figure 5:
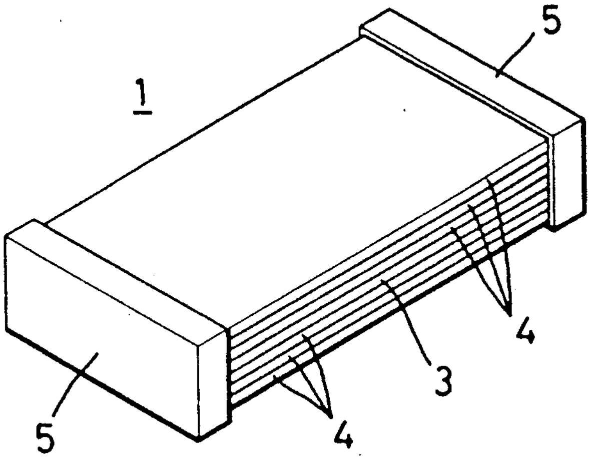
FIG.5 (PRIOR ART)
FIG. 5 is a perspective view showing the conventional lamination type inductor in FIG. 4 in finished form.
Figure 6:
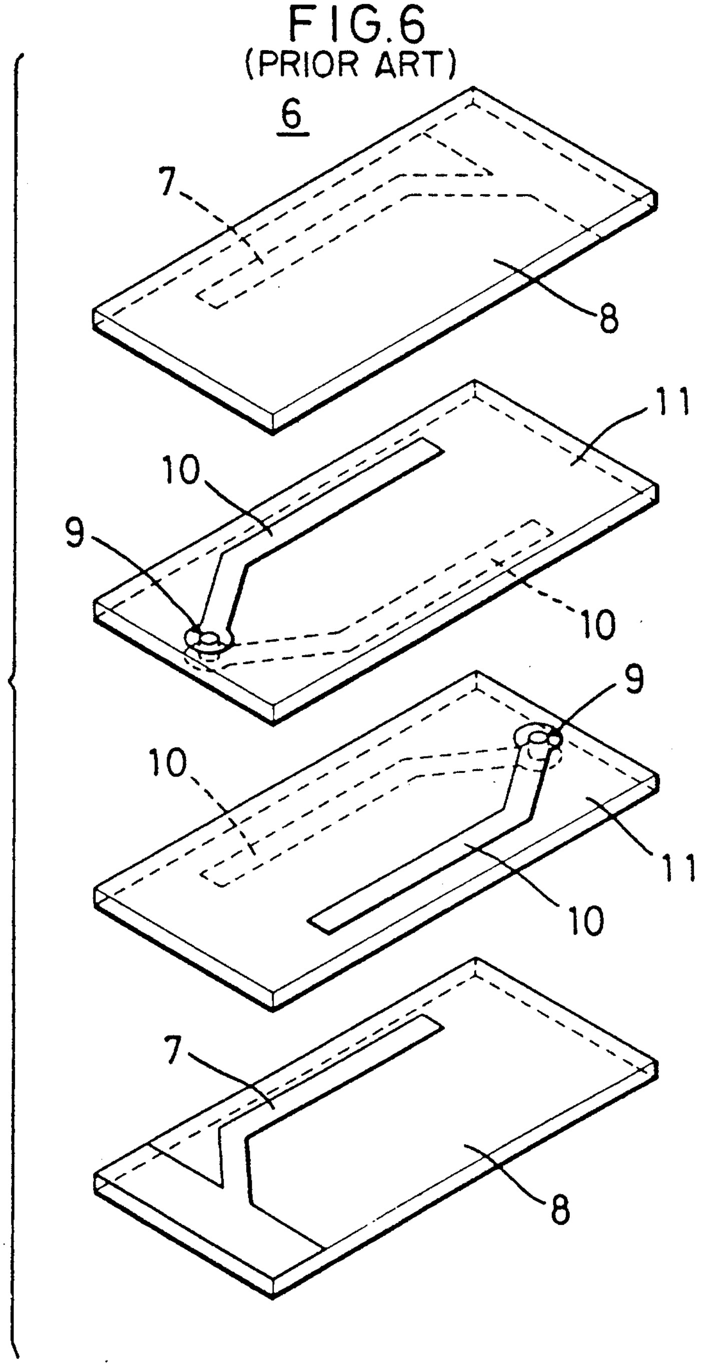
FIG.6 (PRIOR ART)
FIG. 6 is an exploded perspective view showing a further conventional lamination type inductor designed to compensate for the deficiencies of the lamination type inductor shown in FIGS. 4 and 5.

The ceramic green sheet 40 on which conductive paste 44, is applied on both main surfaces thereof is laminated with other green sheets 46 as shown in FIG. 3(C). These ceramic green sheets 40 and 46 are pressed and baked to form an integral sintered body. The sintered body is subjected to barrel grinding, and conductive paste is applied at the end portions thereof and then baked to form the outside electrodes 32 as shown in FIG. 2.

The lamination type inductor 20 of the present invention does not need to have the conductive paste 4 applied as frequently and the number of through holes 42 thereof is not so great as the conventional inductor of the similar type, thereby taking less time for manufacturing and increasing work efficiency. Moreover, the first and second conductor patterns 26 and 28 provided on the two surfaces of the ferrite layer 22 are connected through the through hole so securely that occurrence of inferior products is very low and the product is high in reliability.

This invention has a wide range of uses, such as being useful for constituting a parallel coil by laminating a plurality of the ceramic green sheets 40 with the conductive paste 44, or making the coil a transformer by moving 90° in the direction of lamination or the like.

We claim:

1. A lamination type inductor, comprising:

a ferrite layer having opposite main surfaces each with a periphery including opposite ends having end edges thereat, said ferrite layer further having end edges at the opposite ends of said main surfaces and a through hole therein along the periphery, said ferrite layer having a conductor pattern on each main surface thereof, the conductor pattern on one main surface having a first end portion along one end of said one main surface and extending 0.75 turn from about the middle of said first end portion along the periphery of said one main surface of said ferrite layer to said through hole, and the conductor pattern on the other main surface having a second end portion along the other end of said other main surface and extending 0.75 turn from about the middle of said second end portion along the periphery of said other main surface of said ferrite layer to said through hole, said conductor patterns being electrically connected through said through hole for forming a substantially 1.5-turn coil;

outside ferrite layers laminated onto the opposite main surfaces of said ferrite layer and having outside end portions corresponding to the opposite ends of said ferrite layer; and outside electrodes on the outside of said laminated body at the respective outside end portions of aid outside ferrite layers and the end edges of said ferrite layer and electrically connected with said first and second end portions.

* * * * *